Patented Aug. 24, 1926.

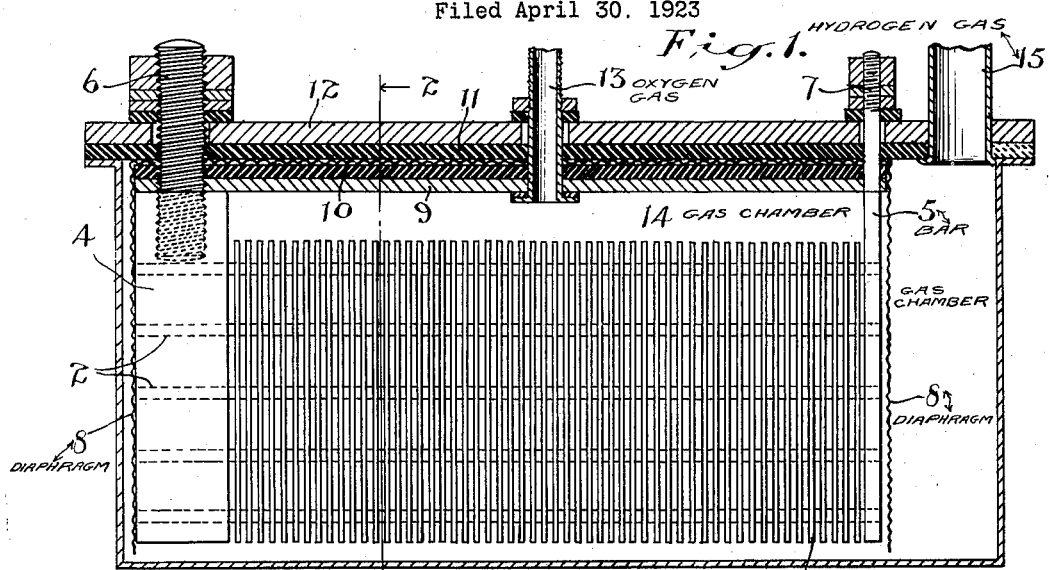
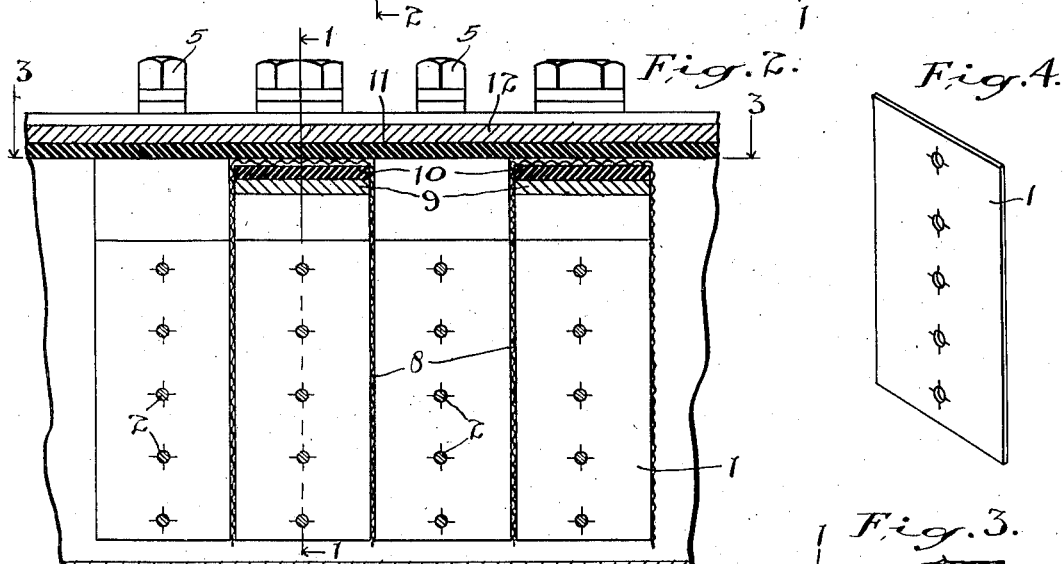
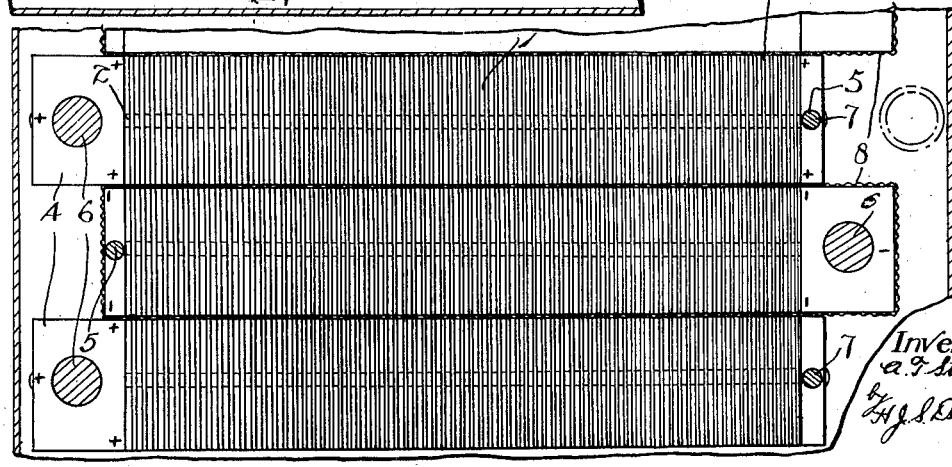

1,597,552

UNITED STATES PATENT OFFICE.

ALEXANDER T. STUART, OF DETROIT, MICHIGAN.

ELECTROLYTIC CELL.

Application filed April 30, 1923. Serial No. 635,630.

An object of this invention is to devise an electrode structure for electrolytic decomposition apparatus, which is particularly adapted for use in the production of oxygen and hydrogen gases, which has a remarkably large surface contact with the electrolyte and a corresponding capacity for gas production.

In carrying out the invention the electrode comprises broadly a plurality of thin metallic strips, spaced apart, and means for binding them together in their spaced relation.

In the drawings:—

Fig. 1 is a vertical section through an electrolytic cell taken on the line 1—1 of Fig. 2;

Fig. 2 is a vertical section taken on the line 2—2 of Fig. 1;

Fig. 3 is a transverse section on the line 3—3 of Fig. 2; and

Fig. 4 is a perspective detail of one of the electrode strips.

In the construction shown in the accompanying drawings and hereinafter described, the electrodes are connected to the poles of the current and each electrode consists of a plurality of thin metallic strips 1 and the current is uniformly distributed to all of the strips of each electrode so that they present the greatest possible active surface for the mass of material. These strips are spaced apart and are assembled on rods 2, and the ends of the rods 2 are secured in bars 4 and 5. A convenient method for manufacturing this particular type of electrode is to aperture the strips to receive the rods 2 and to split the strips radially around the apertures 20 so that when the rods are forced through the apertures 20 the radial divisions 21 of the strips will grip the rods securely. This makes a substantial electrical contact of the strips and the rods and holds the strips securely in position in their spaced relation. Each electrode thus formed presents a plurality of active electrode surfaces to the electrolyte. The bars 4 are provided with terminals 6 and the bars 5 are provided with bolt extensions 7 by means of which the electrodes are suspended in the cell. The terminals 6 of alternate electrodes are arranged at opposite sides of the cell and the edges of the alternate electrodes are spaced apart and separated by diaphragms 8 of dielectric material, preferably asbestos cloth, when the cell is used as an oxygen-hydrogen generator. The diaphragms 8, as shown in the drawings, take the form of tubular shrouds closed at the top and completely enclose, except at the bottom, alternate electrodes. In the structure shown a metal bar 9, having a rubber strip 10 at the top, is spaced above the strips 1 and supports the top of the shroud. A rubber insulating sheet 11 covers the top of the shroud and the whole structure is suspended from the cover plate 12. The terminals 6 and bolt extensions 7 are suitably insulated from the cover. A tube 13 forms a conduit to conduct the gas from the chamber 14 above the electrodes. By enclosing each alternate electrode in a shroud the gas formed therein can only find egress through the tubes 13. A tubular outlet 15 is provided in the cover 12 to conduct the gas, from the cell, which is generated by the uncovered electrodes. Thus the gas produced by the electrodes enclosed by the shrouds or diaphragms is separated from that produced from the other electrodes. This construction is such that the electrolyte is afforded free circulation and the gases rise freely from the strips to receiving chambers of ample proportions from which they are conducted.

Having thus fully described my invention what I claim as new and desire to secure by Letters Patent is:

1. An electrode for electrolytic decomposition apparatus comprising a plurality of substantially parallel, spaced, strips electrically connected with the same pole and a rod passing through said strips for maintaining their spaced relation.

2. An electrode for electrolytic decomposition apparatus comprising a plurality of substantially parallel, spaced, strips, and a rod passing through said strips for maintaining their spaced relation, said strips having electrical contact with the rod.

3. An electrode for electrolytic decomposition apparatus comprising a plurality of thin metallic strips, spaced apart, and rods passing through said strips and binding them together in their spaced relation.

4. An electrode for electrolytic decomposition apparatus comprising a plurality of apertured metallic strips spaced apart, and rods inserted through the apertures on which the metallic strips are assembled, said metallic strips being split around the apertures whereby the metal of the strips will grip the rods and hold the strips spaced apart.

5. An electrode for electrolytic decomposition apparatus comprising a plurality of thin metallic strips spaced apart, rods for binding them together in their spaced relation, and bars in which the ends of the rods are secured.

6. An electrode for electrolytic decomposition apparatus comprising a plurality of thin metallic strips spaced apart, rods passing through said strips and binding them together in their spaced relation, and bars in which the ends of the rods are secured.

7. An electrolytic decomposition apparatus comprising a cell, electrodes therein, and diaphragms enclosing, except at the bottom, alternate electrodes.

8. An electrolytic decomposition apparatus comprising a cell, electrodes arranged therein, diaphragms enclosing, except at the bottom, alternate electrodes, and means above the electrodes for collecting the gases from electrodes of opposite polarity and keeping them separated.

ALEXANDER T. STUART.